Patented Oct. 25, 1949

2,485,587

UNITED STATES PATENT OFFICE 2,485,587

SHEET LUMBER

Worth C. Goss, Seattle, Wash., assignor, by direct and mesne assignments, to United States Sheetwood Company, Seattle, Wash., a corporation of Delaware No Drawing. Application December 22, 1945, Serial No. 637,107

3 Claims. (Cl. 106—163)

This invention relates to sheet lumber, and its manufacture. More particularly, the invention has reference to the manufacture of sheet lumber from wood waste materials and the principal object of the invention is to produce a homogeneous, firm, strong and water-repellent wood sheet of a kind that is especially adapted for those building purposes to which lumber or boards as ordinarily used for flooring, siding or sheating of residences and the like, is put.

Explanatory to the various objects and advantages of the present invention that will be hereinafter recited, it will be stated that in arriving at the present invention, I have found that if a mixture of wood waste materials, such as sawdust, chips, shavings, hogged fuel and the like, is boiled in water or steamed, and then, after having the excess water removed therefrom, is passed through an attrition type grinder, the product of this grinding will consist of an excellent mixture of fibers that may be pressed into sheets, or boards. However, even though the fiber sheets be pressed wet and dried in the press, they do not at moderate densities, possess the strength and durability that is most desired in boards of this type for most satisfactory use in present day building constructions.

I have also discovered, in my work pertaining to this invention, that the residue left in the forests as a result of the action of certain fungi on wood, especially on fallen tree trunks that are lying on the forest floor, may be formed into a glue which, under certain conditions of treatment, becomes extremely adhesive and waterproof. The type of fungi which produce substance suitable for the manufacture of this glue therefrom, are of the general classification which produce what is known as "brown rot" in wood rather than "white rot." This material left on the forest floor as the end product of decomposition of wood, under the influence of moisture, the various fungi and long-time aging, is brown in color and when dry, is of a very low density; that is, approximately .15 specific gravity.

It should be explained here that the family of "brown rot" producing fungi quantitatively feed on the cellulose and non-lignin content of wood until only the lignin portion is left. This residue is somewhat chamically changed from the original lignin after complete action of the fungi, in that the oxygen content is higher than that of natural lignin. The material differs from peat in that decomposition has occurred out of water and in general has a much lower Cross and Bevan cellulose analysis than peat would have. "White rot" fungi, on the other hand, feed on the lignin constituents of wood and thus render it valueless for the purpose of preparing glue.

If this decayed wood, that is, the residue which is the result of the action of the "brown rot" producing fungi, is gathered and ground wet to a thick paste of smooth texture, as for example, in a ball mill, it may be applied as a glue which, under heat and pressure, will give up its water and leave a very excellent water-proof joint.

The selected decayed wood can, however, be reduced while dry to a dry, powdery material and mixed with the moist or wet fiberized material and will, under suitable conditions of heat and pressure, be an effective bonding agent.

If the bonding agent derived by reducing or grinding the decomposed wood in the manner explained, is mixed with the steamed hot chips or wood waste to a designated percentage by weight prior to or while the chips or wood waste is being passed through the attrition type grinder, it will, in the grinding operation, be evenly distributed over all surfaces of all fibers produced. Then, a sheet made up of a matted layer of these fibers, upon being pressed, either while wet within one designated range of temperature or pressed while dry within a higher range of temperature, will produce a firm, strong and homogeneous board or sheet which will not disintegrate when subjected to soaking in water and will have a high degree of dimensional stability.

In view of the above explanatory matter, it has been the principal object of this invention to provide a new and economically feasible method for the manufacture of sheet lumber from fiberized wood or other ligno-cellulosic material, utilizing therein the glue as derived from the decayed wood as a bonding agent.

It is also an object of the invention to provide, as an article of manufacture, boards or sheet lumber from fiberized or finely divided wood waste materials; an article that is especially desirable for those building use for which sheathing, flooring, siding and panel boards are ordinarily put, but which is also useful for the making of furniture, cabinets, shelving and various other articles of manufacture for which lumber is used.

Still another object of the invention is to provide, from ground wood waste materials, an article of manufacture comprising a homogeneous lumber sheet that is water-repellent; that is without grain, and will receive nails without splitting and will hold them better than they would be held by many kinds of wood; furthermore, a lumber sheet that may be sawed easily and which may be made in various thicknesses, degrees of hardness and in various colors.

Yet another object of this invention is to provide an adhesive material or glue from wood that has decayed under action of brown rot fungi and to use this adhesive as a bonding agent in the composition of sheet lumber that is made from ground wood products or from plies of wood.

Another object of the invention is to devise a novel method for the making of a glue from wood.

More specifically stated, the objects of the present invention reside in the various steps of my method of making sheet lumber from wood waste materials and in the sequence of the several steps in the method. Also in the article that is produced by practising the method.

To accomplish the above mentioned and other objects of the invention, I first prepare the mixture of wood waste materials. This mixture is made up of the material that I will refer to as the "body material" and the "bonding agent." The body material may comprise from 70% to 95% by weight of wood chips, sawdust, hogged fuel, shavings or other cellulosic materials, and the bonding agent would make up the balance of the mixture.

The chips, sawdust, hogged fuel, shavings, or other ligno-cellulosic material to be employed, is first placed in a suitable container and is boiled in water, or given an equivalent treatment in steam; the heat of the hot water or steam in this treatment not being sufficient to cause presetting or polymerizing of the lignin constituent. Then it is drained of all free water and while still hot, is passed through an attrition type grinder and reduced to a mass of fibers.

Coincident with the grinding, or with the feeding of the treated material to the grinder, the bonding agent, prepared as previously explained from decomposed wood, is fed into the machine. The rate of feeding is such that the desired proportions, by weight, of body material and bonding agent are obtained in the finished product. The addition of this agent will cause all of the fibers produced by the attrition mill to be effectively coated. This coating renders them somewhat brownish in color.

It will be understood that the relative percentages to be used of bonding agent and body material in the form of chips, hogged fuel, or whatever the selected material may be, is dependent upon the particular kind of body material being employed, or upon the results desired to be attained by the mixture in the completed article but is predominately body material.

After the fibers produced by the grinding have passed through the attrition grinder and mixed with the bonding agent, they are formed into a matted layer of uniform thickness, for example, as by sifting them through a coarse mesh sieve onto a flat plate. Then the matted sheet is consolidated by mechanical pressure in any suitable type of press; for example, a press such as used for veneer pressing; heat of a designated temperature being applied during the pressing operation to complete or to expedite the formation of the sheet.

Ten inches of the loosely sifted fibers with the bonding agent mixed therewith, when formed under a pressure of approximately fifty pounds per square inch, and at a temperature of 350° F., produces a finished board of about ⅝ inch thickness. Under this heat and pressure, the fibers will be well interlocked and a strong, resilient board having a density of about .70, a tensile strength of about 1250 lbs. per square inch, and a modulus of rupture of about 1800 lbs., will be formed.

It will be understood that the density of this sheet lumber is determined by pressure and temperature employed in the press, and a much denser board may be formed than that above described; the density increasing to 1.3 or over simply by application of higher pressure during the period that the board is being formed. A material of this density will show a hardness greater than that possessed by the hardest oak wood. Material of this higher density will be of a blackish brown color, derived from the adhesive binder which turns black when pressed to a high density in the presence of moisture and heat. Boards may be made darker by increase of heat or pressure and heat.

A glued joint made with this glue and properly pressed, is of a nearly black color. The lower density boards do not exhibit this black color as this appears in general only on considerable densification of the adhesive.

In that part of the present invention relating particularly to the making of a glue, or the bonding agent, it will be explained further that the condition of the acidity of the glue formed should preferably be between a pH of 3 and 8. I have found that a very good result is obtained with a pH of 5.5. If this is not existent in the material as formed, a suitable agent such as acetic acid or sodium hydroxide may be added.

Boards glued together with this bonding agent may be soaked for any time in water, even until completely saturated, and yet the glue joint remains strong and adhesive. Thus, the glue is desirable for use in the making of ordinary plywood panels.

In connection with the relative proportions of the body material and bonding agent, in the making of sheet lumber, it will be stated further that the kind of wood used, the particular uses for which the material is being made, and the characteristics desired therein, all are given consideration, and while I have prepared sheet lumber containing from 2% to 40% of the bonding agent, it is most satisfactory for general uses when about 15% by weight of the bonding agent is used. In general, the strength of the board increases as a greater proportionate amount of adhesive agent is used; 25% of bonding agent giving a density of .73 and a modulus of rupture of 2470 lbs. or more with a pressure of 36 lbs. per square inch and a pressing temperature of 380° F., the board being left in the press until chemical reaction between the glue and the wood fiber is complete.

The water resistance of boards or sheets of lumber formed in accordance with the method described, increases greatly as the temperature under which the mixture is pressed, is increased. For example, a board that is pressed at 300° F. will quickly absorb water, showing a great wicking action, and when wet will show an increase in thickness of about 25% over its thickness when dry. However, it does not disintegrate when wet.

Contrasted with this, a board pressed from the same mixture of materials under a consolidating heat of 386° F. shows no "wicking" action and increases only slightly in thickness and has excellent wet strength.

It is desirable therefore, in the making of this lumber for ordinary uses, to press the mixture at about 350° F. Too high a temperature causes the board to have an undesirable brittleness. The pressure should be about 50 lbs. per sq. in.

It is also anticipated that the heating and drying of the sheet may be effected by high frequency electrical current in a manner and method similar to that which has to some extent been used in the lumber industry to dry and set thick veneer sheets.

The chemical composition of the adhesive is probably a partially hydrolized form of lignin, and apparently is much superior to natural lignin. The chemical reactions of the adhesive are of interest in that they show a difference from a chemical reaction of natural lignin. For example, about 70% of the adhesive is soluble in one per cent sodium hydroxide solution during a short boiling period which is not true of natural lignin.

In the making of such lumber, it is not necessarily required that the body material be free of bark or limited in percentage of bark. As one specific example, I have formed a strong, usable board sheet from the bark removed from spruce pulp wood in the Northern Midwest section of the United States. The operation was carried on as follows: First, the pulping wood was barked hydraulically, leaving the bark quite wet. The wet bark was then ground through an attrition mill and mixed with 10% of the adhesive which had been carefully prepared from rotted wood of the type known as brown rot as previously explained, and which, after preparation, is in the form of very fine subdivision and may be added to the ground bark in the form of thick sludge. Ten per cent by weight of the bonding adhesive mixed with ninety per cent of bark, produced an excellent board in the final treatment. After the first mixing of the adhesive with the ground bark, the wet mass was passed twice through an attrition mill. This double passage results in a very thorough coating of adhesive to all the fibers. The thoroughly coated fibers were then sifted through a screen to form a thick pad which was pressed into the finished sheet at a pressure of fifty pounds per square inch and at a temperature of 350° F. Such sheets, however, can be pressed in either a platen press or a traveling belt press in which continuous production is achieved in the form of a board four feet wide, which is endless and which may be made of any thickness or density desired.

A specific example of another board of a type which is especially useful for home building, consists of a sheet $\tfrac{7}{16}$ inch thick, with a density of .84, a modulus of rupture of 2,360 lbs. and a tensile strength of 1620 lbs. per square inch. The same material may be pressed to give a slightly higher density .874 in which case the material has a modulus of rupture of 3,300 lbs. In each case, the temperature of pressing may be about 350° F. and the board left in the press until dry and the chemical reaction between glue and fibers is complete.

It has been found that the adhesive, or bonding agent made from the described decomposed wood, will become effective for its intended purposes under quite varying conditions of heat and pressure. Its water-resistant or repellent qualities appear to be much better if the material is ground to a semi-colloidal mass. In the making of the present sheet lumber, it is extremely desirable that all fibers be coated to the maximum extent with this agent and this can be most effectively accomplished by pouring it into the grinder along with the wood chips. It has been shown that, when the bonding agent is so prepared and so applied to the wet fibers, a sheet that is consolidated under pressure and at a temperature of 380° F. until dry, will be absolutely water-resistant and of excellent characteristics for use as a building material. The thorough coating of all the individual fibers with the adhesive is therefore of prime importance to insure the maximum water resistance.

During the period of pressure and application of heat, the moisture is expelled from the material and it is delivered dry from the press. Best results are obtained by leaving the sheets in the press until absolutely dry. This means until all water given off by chemical reaction is expelled.

The board or sheet of lumber so formed is extremely tough and has the property of taking and holding nails in much the same manner as does a plank of tough and resilient wood. The sheet is water resistant, but may, under some conditions of manufacture, absorb moisture to some extent if soaked in water. However, it will not disintegrate when wet due to the waterproof properties of the bonding agent or glue.

If it is found desirable, this sheet lumber could be additionally water-proofed by addition to the mixture of any of the commonly used substances used for this purpose, such as paraffin, petrolatum or silicon compounds.

The lineal expansion of the board formed as above described from a bone dry to a soaking wet condition is approximately .6 of 1%.

It is not the intent that the main claims herein shall in any way confine the scope of the invention to specific proportions of body material and bonding agent. Neither is it desired that the claims on the glue or adhesive shall confine it to use only with sheets made from ground or fiberized wood, but that it shall cover it as a bonding agent or glue for sheets, plies of wood or fibers, or as an article or product of manufacture.

In the claims which terminate this specification, where the term "decomposed wood" is used without further qualification, it is to be understood to designate wood that has become decomposed to a condition of brown rot, or to any comparable condition that makes it suitable for the preparation of an adhesive therefrom, in a similar manner and for similar uses.

By the term "raw wood fibers" I mean wood fibers that have not, after being formed, been subjected to any degree of cooking by steam or hot water that would cause any appreciable presetting or polymerizing of the lignin therein.

Having thus described my invention what I claim as new therein and desire to secure by Letters Patent is:

1. As an article of manufacture, a hard, rigid board of the character of lumber, comprising a heat and pressure consolidated mixture of wood fibers constituting from 60 to 98% of the mixture, based on the dry weights of materials, and from 2 to 40% of a bonding agent consisting of brown rotted wood.

2. As an article of manufacture, a hard, rigid board of the character of lumber, comprising a heat and pressure consolidated mixture of wood fibers constituting from 70 to 95% of the mixture, based on the dry weights of materials, and from 5 to 30% of a bonding agent consisting of brown rotted wood reduced to paste-like consistency.

3. As an article of manufacture, a hard, rigid board of the character of lumber, comprising a heat and pressure consolidated mixture of wood fibers constituting about 85% of the mixture, based on the dry weights of materials, and about 15% of a bonding agent consisting of brown rotted wood reduced to paste-like consistency.

WORTH C. GOSS.

REFERENCES CITED

The following references are of record in the file of this patent:

UNITED STATES PATENTS

| Number | Name | Date |
| --- | --- | --- |
| 1,497,808 | Summers | June 17, 1924 |

FOREIGN PATENTS

| Number | Country | Date |
| --- | --- | --- |
| 11,940 | Australia | Jan. 25, 1945 |
| 531,409 | France | Jan. 12, 1922 |
| 334,494 | Germany | Mar. 14, 1921 |
| 154,574 | Great Britain | Oct. 27, 1920 |